United States Patent
Pithewan et al.

(10) Patent No.: US 9,253,032 B2
(45) Date of Patent: Feb. 2, 2016

(54) DISJOINT PATH COMPUTATION FOR ARBITRARY DIRECTED GRAPH

(71) Applicant: Infinera Corp., Annapolis Junction, MD (US)

(72) Inventors: Khuzema Pithewan, Gottigere (IN); Muhammad Yaaseen, New Tippasandra (IN); Rajkumar Pennadam Ramamoorthy, Salem, TN (US); Mohit Misra, Sarjapur Village (IN)

(73) Assignee: Infinera Corporation, Sunnyvale, CA (US)

( * ) Notice: Subject to any disclaimer, the term of this patent is extended or adjusted under 35 U.S.C. 154(b) by 236 days.

(21) Appl. No.: 14/040,912

(22) Filed: Sep. 30, 2013

(65) Prior Publication Data
US 2015/0095466 A1  Apr. 2, 2015

(51) Int. Cl.
*G06T 15/50* (2011.01)
*H04L 12/24* (2006.01)
*H04L 12/947* (2013.01)

(52) U.S. Cl.
CPC ............ *H04L 41/0803* (2013.01); *H04L 49/25* (2013.01)

(58) Field of Classification Search
None
See application file for complete search history.

(56) References Cited

U.S. PATENT DOCUMENTS

2002/0143926 A1* 10/2002 Maltz .................. H04L 41/0213
709/224
2005/0271073 A1* 12/2005 Johnsen ................ H04L 49/251
370/428

* cited by examiner

*Primary Examiner* — Peter Hoang
(74) *Attorney, Agent, or Firm* — David L. Soltz

(57) ABSTRACT

Systems and methods for accessing network configuration data identifying one or more working path(s) configured to transport data between source and destination nodes, wherein multiple working paths are prioritized, and including at least one first diversity weight of a first value indicative of at least one communication link in the working path(s), and at least one second diversity weight of a second value indicative of at least one communication link outside of the working path(s); calculating a disjoint protection path with the network configuration data, the first diversity weight, and the second diversity weight; the disjoint protection path including at least the source node and the destination node and at least one communication link that is mutually exclusive from the at least one communication link of the first set; and outputting at least one setup signal to configure the disjoint protection path within the mesh network.

28 Claims, 7 Drawing Sheets

DISJOINT PATH COMPUTATION FOR ARBITRARY DIRECTED GRAPH

FIELD OF THE DISCLOSURE

The disclosure generally relates to methods and apparatuses for determining diverse protection resources for shared mesh protection. More particularly the disclosure relates to identification of disjoint paths in mesh networks. Though the methodologies set forth herein are in the context of traffic engineering (TE) routing in data networks, such methodologies may be applied to any transport networks that utilize protection and recovery provisioning.

BACKGROUND

Traffic Engineering (TE) is a technology that is concerned with performance optimization of operational networks. In general, Traffic Engineering includes a set of application mechanisms, tools, and scientific principles that allow for measuring, modeling, characterizing and control of user data traffic in order to achieve specific performance objectives.

A circuit switched network usually includes multiple switch nodes (also referred to as "nodes") which are arranged in a topology referred to in the art as a "mesh network". Within the mesh network, user traffic can be transported between any two locations using predefined connections specifying particular links and/or switch nodes for conveying the user traffic.

The switch nodes in the mesh network are each provided with a control module. The control modules of the switch nodes function together to aid in the control and management of the circuit switched networks. The control modules can run a variety of protocols for conducting the control and management of the circuit switched networks. One prominent protocol is referred to in the art as "Generalized Multiprotocol Label Switching (GMPLS)".

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel.

Generalized Multiprotocol Label Switching includes multiple types of label switched paths including protection and recovery mechanisms which specifies predefined (1) working connections within a mesh network having multiple nodes and communication links for transmitting data between a source node and a destination node; and (2) protecting connections specifying a different group of nodes and/or communication links for transmitting data between the source node to the destination node in the event that one or more of the working connections fail. Working connections may also be referred to as working paths. Protecting connections may also be referred to as protecting paths and/or protection paths. A first node of a path may be referred to as a headend node or a source node. A last node of a path may be referred to as a tailend node or end node or destination node. Data is initially transmitted over the working connection (such as an optical channel data unit label switched path) and then, when a working connection fails, the headend node or tailend node activates one of the protecting connections for redirecting data within the mesh network.

However, current systems for protection and restoration do not take into account the need for protection paths with disjoint communication links and/or disjoint nodes from the original working path. Systems and methods are needed to determine disjoint protection paths through mesh networks in order to improve network capacity and reliability. Further, systems and methods are needed to prioritize protection for multiple working paths.

SUMMARY

The problem of determining disjoint protection in mesh networks is addressed through systems and methods for the identification and configuration of disjoint protection paths and prioritization of disjoint protection for multiple working paths. Diversity weights are determined for communication links in the mesh network and utilized to determine a diverse protection path for a working path in the mesh network.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
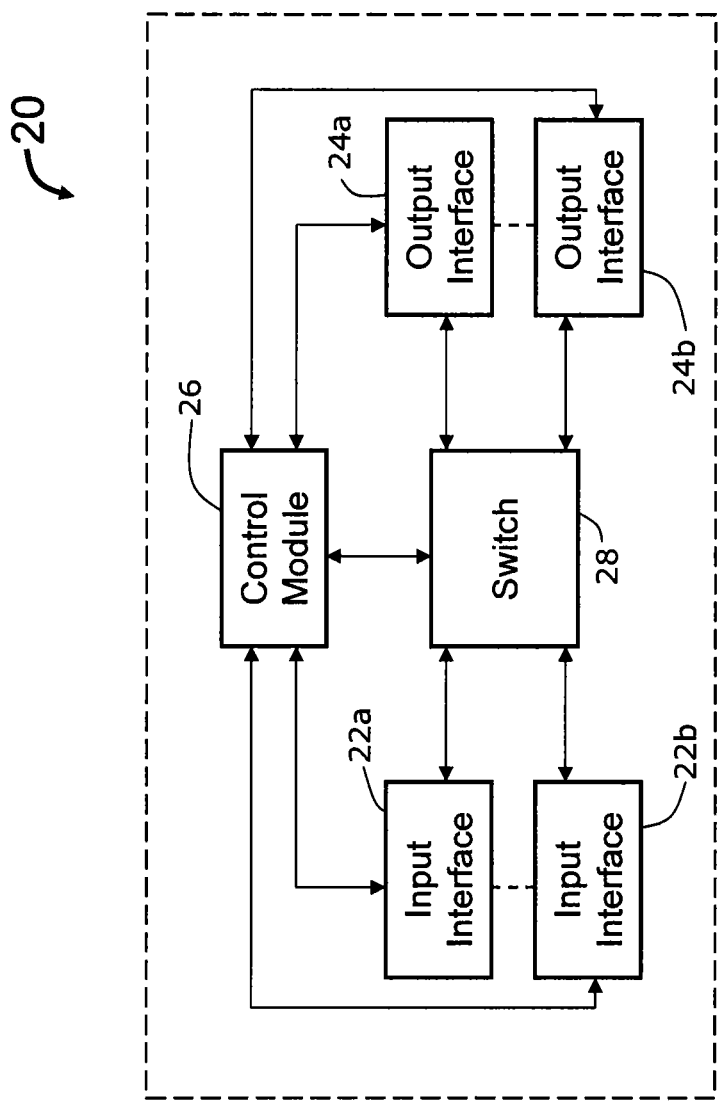
FIG. 1 is a block diagram of an exemplary node constructed in accordance with the present disclosure for communicating via a mesh network.

The following detailed description refers to the accompanying drawings. The same reference numbers in different drawings may identify the same or similar elements.

The mechanisms proposed in this disclosure circumvent the problems described above. The present disclosure describes a computer-readable medium, comprising at least one non-transitory memory storing instructions that, when executed by one or more processors, cause the one or more processors to access network configuration data stored in the at least one non-transient memory or another non-transient memory. The network configuration data is indicative of a network topology of a mesh network comprising a plurality of nodes and a plurality of communication links configurable to provide optical paths between a source node of the plurality of nodes and a destination node of the plurality of nodes, the network configuration data identifying a working path configured to transport data between the source node and the destination node, the working path having a first set of at least the source node and the destination node of the plurality of nodes and at least one communication link of the communication links, the network configuration information also including at least one first diversity weight of a first value indicative of at least one communication link in the working path, and at least one second diversity weight of a second value indicative of at least one communication link outside of the working path. And further causing the one or more processors to calculate a disjoint protection path for the working path with the network configuration data indicative of the network topology of the mesh network, the at least one first diversity weight, and the at least one second diversity weight; the disjoint protection path having a second set of (a) nodes including at least the source node and the destination node and (b) at least one communication link that is mutually exclusive from the at least one communication link of the first set; and output at least one setup signal via at least one of an output interface or an output port to configure the disjoint protection path within the mesh network. The at least one setup signal can be an electronic or optical signal that is transmitted to one or more of the nodes in the mesh network. The calculation of the disjoint protection path may be done with an algorithm, such as a Shortest Path First Algorithm, for example, Dijkstra's Algorithm.

In one embodiment, the at least one first diversity weight of the first value indicative of at least one communication link in the working path may be based at least in part on quantity of communication links in the working path. The at least one second diversity weight of the second value indicative of at least one communication link outside of the working path may be a predetermined value, for instance, zero.

In one embodiment, the predetermined value may be based at least in part on whether the at least one communication link outside of the working path shares a node with the working path. For example, the predetermined value may be a higher value if the at least one communication link shares a node with the working path than if the at least one communication link does not share a node with the working path. For example, the predetermined value may be assigned a value of one if the at least one communication link shares a node with the working path and may be assigned a value of zero if the at least one communication link does not share a node with the working path.

In one embodiment, the protection path may be determined in a network topology with multiple working paths and the working paths may be assigned priorities relative to one another. For example, the priorities may be set such that in a failure of the first and second working paths, the data carried on the second working path having a higher priority is switched to a disjoint protection path before the data carried on a first working path having the lower priority is switched.

In one embodiment, the first diversity weights are based at least in part on the quantity of communication links in the working paths. For example, the first diversity weights may be the largest quantity of communication links in the first or second working paths.

In one embodiment, the first diversity weights are based on the following algorithm: [(sum of the quantity of communication links in the first working path and the second working path) minus (sum of the quantity of working paths)] multiplied by two.

In one embodiment, the diversity weights of communication links in working paths with higher priority than at least one other working path are based on the following algorithm: (the largest quantity of communication links of the first or second working paths) multiplied by (the first diversity weight) plus one.

In one embodiment, the at least one second diversity weight of the second value indicative of at least one communication link outside of the working path is a predetermined value, such as zero. In one embodiment, the predetermined value is based at least in part on whether the at least one communication link outside of the working path shares a node with the working path. For example, the predetermined value may be a higher value if the at least one communication link shares a node with the working path than if the at least one communication link does not share a node with the working path. For example, the predetermined value based at least in part on the number of nodes shared by the disjoint protection path and the working path may be assigned a value of one if the at least one communication link shares a node with the working path and assigned a value of zero if the at least one communication link does not share a node with the working path.

DEFINITIONS

If used throughout the description and the drawings, the following short terms have the following meanings unless otherwise stated:

CSPF stands for Constrained Shortest Path First, also referred to as Constrained SPF. CSPF is a network protocol which utilizes algorithms for choosing a network path that is the shortest path fulfilling a set of constraints.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

The term "hop", as used herein, refers to a move, or possible move, of data from one node to another node in a mesh network. The number of hops (or hop count) of a connection may be indicative of the number of moves of data from the start node to the end node in the network. For example, in a connection from node A through nodes B and C to node D, the hop count would be three (A to B, B to C, and C to D).

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OSPF stands for "Open Shortest Path First." OSPF is a network routing protocol. OSPF is further defined in RFC 2328 and RFC 5340. OSPF-TE stands for OSPF Traffic Engineering. OSPF-TE is an extension of the OSPF network routing protocol for use with GMPLS incorporating traffic engineering.

OTN stands for Optical Transport Network which includes a set of optical switch nodes which are connected by optical fiber links. ITU-T recommendations G.709 and G.872 define OTN interface requirements and network architecture respectively.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In general, enhanced mesh protection for availability and reliability of data traffic transmission may be achieved by providing protection paths for the working paths where the protection paths are disjoint (also known as "diverse") from the working paths. The more diverse the protection path is from the working path, the fewer resources (such as communication links and nodes) are shared between the protection path and the working path. For example, the protection path may be diverse from the working path in that at least one communication link is different, i.e. mutually exclusive, from the communication links in a set of communication links used in the working path (referred to as "communication link disjoint"), and/or the protection path may be diverse from the working path in that the protection path does not use one or more of the transit nodes used by the working paths (referred to as "node disjoint"). When a protection path is not using any communication link from the working path and may go via any nodes of working path using different communication link, the protection path is referred to as "absolute communication link diverse" from the working path. Similarly when a protection path is not using any communication links and nodes from the working path, such protection path is referred to as "absolute node and communication link diverse" from the working path. In the case of multiple working paths, the working paths may be assigned a priority such that preferred protection path is most diverse from the highest priority working path.

To implement such protection, diversity weights may be utilized in determining preferred protection path. At least one diversity weight may be assigned to at least one communication link in a mesh network. The diversity weight may be different from the user configured network weight of the communication links. User configured network weights are typically a function of cost, such as hop count, capacity, speed, usage, availability, monetary cost, packet loss probability, latency of the communication link, etc. Diversity weights may be chosen such that the preferred protection path is the path that is most diverse from the working path, or from the highest priority working path in the case of multiple working paths. The diversity weights may be selected to weight certain communication links over others based on predetermined criteria, such as sharing of resources. The diversity weights may be arbitrary values that fulfill the function of differentiating communication links based on the predetermined criteria.

Using the diversity weights, an algorithm may be utilized to find the preferred protection path through the mesh network. For example, a Shortest Path First Algorithm may be used. It will be understood that any algorithm that provides a shortest path between two nodes on a topology can be used. It will be understood that the term "shortest path" is not limited to determining paths based only on distance, and is intended to encompass any metric, or combination of metrics, which can be used to specify the "cost" of a communication link. A non-exhaustive list of metrics includes diversity, distance, number of hops, capacity, speed, usage, availability, monetary cost, packet loss probability, latency of communication links (i.e. delay of the communication link), etc.

One example of a graph search algorithm for determination of shortest path (i.e. the Shortest Path Algorithm) is Dijkstra's Algorithm. In general, for a given source node (vertex) in the network, Dijkstra's Algorithm finds the path with lowest cost between the source node and every other node. Dijkstra's Algorithm can also be used for finding costs of shortest paths from a single node to a single destination node by stopping the algorithm once the shortest path to the destination node has been determined. Dijkstra's Algorithm assigns some initial distance values and tries to improve the distance values step by step.

Dijkstra's Algorithm, also known as Dijkstra's Method and as Dijkstra's Shortest Path Algorithm, is well known in the art (see E. W. Dijkstra: *A note on two problems in connection with graphs*, Numerical Mathematics, 1:269-271, 1959). For example, U.S. patent application Ser. No. 10/359,700, publication number 2003-0223373A1, which is incorporated herein by reference, describes Dijkstra's Algorithm (see paragraphs [0022]-[0031] and FIGS. 1a, 1b, 1 c, 2).

In one embodiment with multiple working paths, the protection path which is communication link disjoint from given working paths, will try to be absolute communication link diverse from the highest priority work path and may use communication links from low priority working paths. If an absolute communication link diverse path from the highest priority working path is not available, then the protection path may use some of the communication links from the highest priority working path but will enforce diversity from at least one communication link from the highest priority working path.

In one embodiment with multiple working paths, the protection path which is node and communication link disjoint from given working paths, will try to be absolute node and communication link diverse from the highest priority working path and may use communication links from low priority working paths. If an absolute node and communication link diverse path from the highest priority working path is not available, then the protection path may use some of the communication links from the highest priority working path but will enforce diversity from at least one communication link from highest priority working path.

In one embodiment, if multiple protection paths with the same diversity weight are identified, then the preferred protection path may be determined by use of a Shortest Path Algorithm utilizing the user configured weights of the multiple protection paths with the same diversity weight.

To clarify the use of diversity weights in the determination of protection path in a mesh network, an exemplary node in an exemplary mesh network will first be described.

Figure 2:
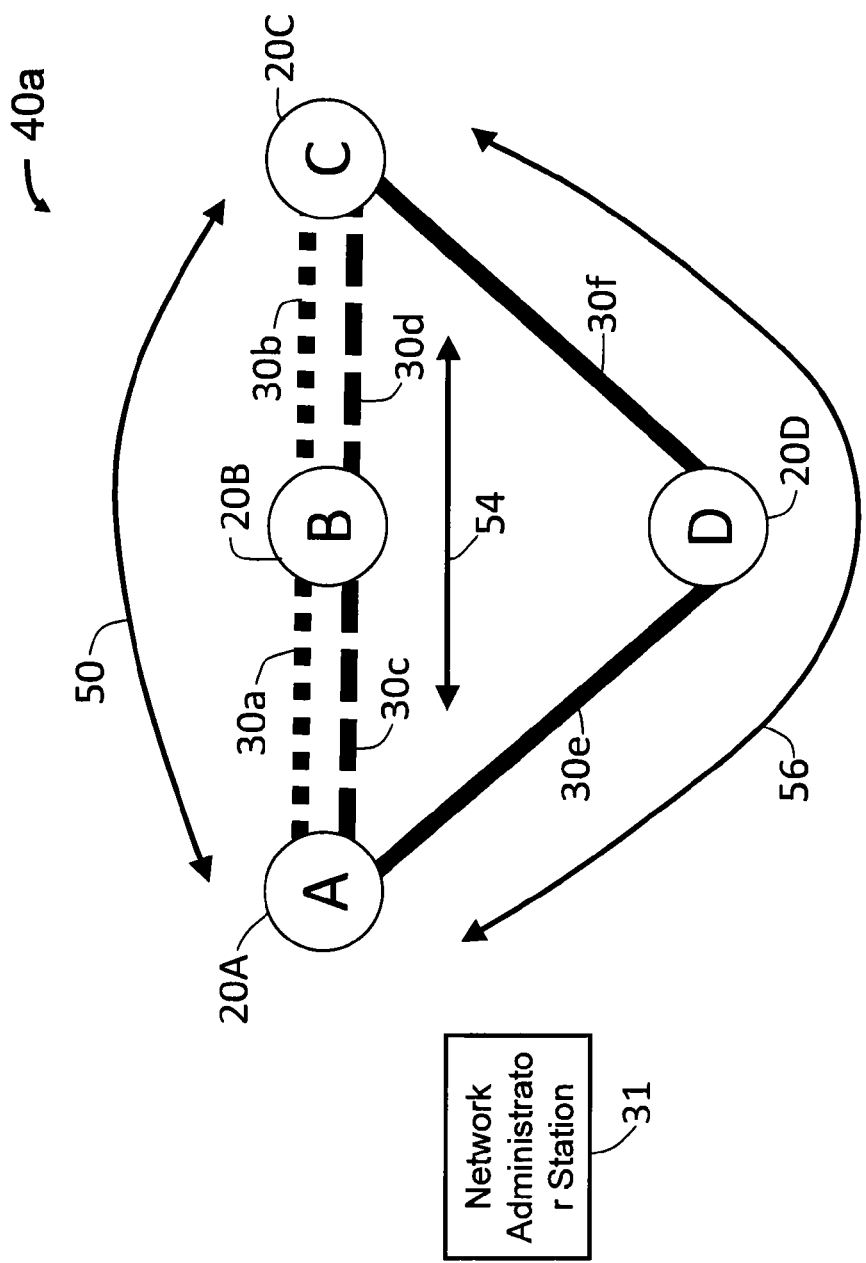
FIG. 2 is a schematic diagram of an exemplary mesh network.

Referring now to the drawings, and in particular to FIG. 1, shown therein and designated by reference numeral 20 is a block diagram of an exemplary node constructed in accordance with the present disclosure. The node 20 is adapted to facilitate the communication of data (which may be referred to herein as "traffic") between multiple nodes 20 in a mesh network 40, such as mesh network 40a as shown in FIG. 2. The mesh network 40 may be, for example, an optical transport network (OTN).

The node 20 is provided with one or more input interfaces 22, one or more output interfaces 24, a control module 26, and a switch 28. In general, the input interfaces, shown here as 22a and 22b, are adapted to receive traffic from the mesh network 40, and the output interfaces, shown here as 24a and 24b, are adapted to transmit traffic onto the mesh network 40 (see FIG. 2). The switch 28 serves to communicate the traffic from the input interfaces 22a and 22b, to the output interfaces 24a and 24b. And, the control module 26 serves to control the operations of the input interfaces 22a and 22b, the output interfaces 24a and 24b, and the switch 28, as well as to set up label switched paths within the mesh network 40. The node 20 may also include non-transitory memory (not shown), either within the control module 26 and/or the switch 28, or separate from the control module 26 and/or the switch 28.

The node 20 can be implemented in a variety of ways, including, commercial installations having one or more backplanes (not shown), racks, and the like. In this example, the input interface(s) 22, the output interface(s) 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interface(s) 22, the output interface(s) 24, the control module 26 and the switch 28 share a power supply and/or housing.

The input interface(s) 22 and the output interface(s) 24 of one node 20 are adapted to communicate with corresponding input interface(s) 22, and output interface(s) 24 of another node 20 within the mesh network 40a via communication links 30, as shown in FIG. 2. An example of an input interface 22 and/or an output interface 24 is an Ethernet card or optical port. In general, each of the input interface(s) 22 and/or the output interface(s) 24 may have a unique logical identification, such as an IP address. The communication links 30 can be implemented in a variety of ways, such as a physical link including electrical (e.g., copper wire or coax) and/or optical signal (e.g., optical fiber or other waveguide) carrying capabilities, or as a wireless link. The communication links 30 can be fiber optic cables, electronics cables, wireless communication links, or the like.

The implementation of the input interface(s) 22, and the output interface(s) 24 will depend upon the particular type of communication link 30 that the particular input interface 22 and/or output interface 24 is designed to communicate with. For example, one of the input interfaces 22 can be designed to communicate wirelessly with another node 20 within the mesh network 40, while one of the output interfaces 24 of the node 20 can be designed to communicate optically through a fiber-optic link. For a particular node 20, the input interfaces 22a and 22b can be of the same type or different types; the output interfaces 24a and 24b can be of the same type or different types; and the input interface(s) 22 and output interface(s) 24 can be of the same type or different types.

The input interface 22 and the output interface 24 are shown separately for purposes of clarity. However, it should be understood that one or more of the input interfaces 22 and/or the output interfaces 24 could be connected to a single communication link 30 and implemented as a single device, such as a line module. Exemplary line modules are described in U.S. Pat. No. 8,223,803 (Application Publication number 20090245289), the entire contents of which are hereby incorporated herein by reference.

A schematic diagram of an exemplary mesh network 40a is shown in FIG. 2, by way of example. In FIG. 2, the mesh network 40a includes nodes 20 labeled as A, B, C, and D. Nodes 20 may be denoted as a source node or destination node for a particular path in accordance to the path setup direction, such as nodes 20A and 20C in FIG. 2. Paths in the mesh network 40a may be unidirectional or bidirectional. Other nodes 20 in the connections between the source node 20A and the destination node 20C are known as transit nodes (also known as intermediate nodes), such as nodes 20B and 20D. The nodes 20 are connected by communication links 30a-30f. The group of communication links 30 used in a particular path through the mesh network 40a may be referred to as a "set" of communication links 30.

In general, Shared Mesh Protection (SMP), as used herein, refers to a situation in which the source or destination node 20A, 20C sets up one or multiple protection paths for a particular working path. Each protection path may reserve the timeslots on the transit nodes 20 of the protection path, but may not actually configure the timeslots until needed. The timeslots may be shared by multiple protection paths. Nodes 20 may contain network topology information. Topology information may be determined by using standard topology discovery procedures.

Typically, the source or destination node 20A, 20C is responsible for detecting the failure of the working path. Once the source or destination node 20A, 20C detects a defect in the working path, the source or destination node 20A, 20C initiates recovery action by activating the corresponding protection path with activation messages and redirecting user traffic onto the protection path. In some cases, a protection path may be established over a set of nodes 20 that are shared by multiple other working paths and/or protection paths. The node 20 that initiates recovery action by activating the corresponding protection path with activation messages may be referred to as the source node 20. The mechanisms used to detect the failure of the working path are known to those in the art.

Upon detection of working path failure (for example, if the communication link 30a between nodes 20A and 20B is cut), the source or destination node 20A, 20C will transmit a signal with activation messages to activate the protection path. By processing the activation messages, the transit nodes 20B, 20D will program the switch fabric and configure the appropriate resources. Upon the completion of the activation, the source or destination node 20A, 20C will switch the user traffic to the protection path.

In general, logical tables in one or more databases (not shown) may be used to support protection path activation logic. Preferably, the tables include one or more connection tables, one or more logical timeslot tables, and one or more real timeslot tables. The connection table(s) maintains the connection-related information, including label, interfaces, and associated timeslot information for the connections. The logical timeslot table(s) is a timeslot translation table(s) between connections and timeslots. The real timeslot table(s) maintains the timeslot-related information, including the active connections that are currently conveying traffic and reserved connections for all timeslots. A reserved connection means there is not any active traffic on the timeslot. In the situation where the protection path is identified in the connection table, the protection path's associated timeslots can be readily discovered utilizing the logic timeslot table and the real timeslot table.

One or more of the nodes 20 in the mesh network 40a, and/or a network administrator station 31, may have or access network configuration data indicative of network topology information and/or may be provided network topology information. Information indicative of topology of the mesh network 40a may be stored on non-transitory memory. It should be understood that information indicative of topology of the mesh network 40a may be stored on non-transitory memory and retrieved by the source node 20. Topology information may be determined by using standard topology discovery procedures. The user configured weight, a function of cost, such as hop count, of the communication links 30, may be known. One or more of the nodes 20 may save information indicative of the determined network topology, such as disjoint protection paths, diversity weights (as will be explained herein), and/or the user configured weights, in non-transitory memory.

Figure 3:
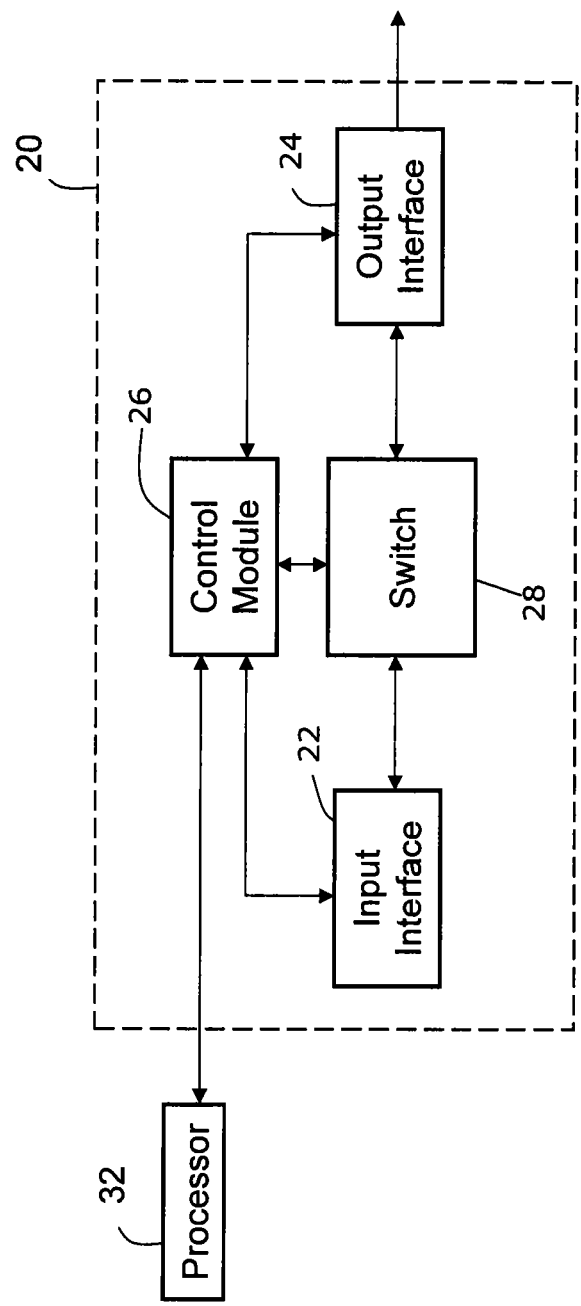
FIG. 3 is a schematic diagram of an exemplary node and external processor.

In one embodiment, one or more processor 32 may be used externally to the source node 20. FIG. 3 is a schematic diagram of an exemplary source node 20 and processor 32. The processor 32 may be any suitable processor 32 and may be located externally to node 20 and/or mesh network 40a. One example of a suitable processor 32 is a processor in a network management station/network administrator station 31. However, it should be understood that the processor 32 may be located anywhere. The processor 32 may execute instructions that cause the processor 32 to perform the methods described herein. The information produced by the processor 32 may be stored in non-transitory memory (not shown). The processor 32 may provide the information to the source node 20 through the control module 26.

In one embodiment, circuitry of the source node 20 may generate signals comprising messages and transmit the signals through an output interface 24 of the source node 20 to an input interface 22 of one or more transit nodes 20 to set up the disjoint protection path(s) in the mesh network 40. The messages may include instructions instructing the transit node(s) 20 of the disjoint protection path to reserve and/or share mesh network 40 resources for the disjoint protection path. Messages may include instructions for configuring nodes 20, time slot information, multiplexing information, and the like.

Circuitry of the source node 20 may generate additional signals comprising additional messages and transmit the signals through an output interface 24 of the source node 20 to input interfaces 22 of the nodes 20 in the working path and the nodes 20 in the protection paths.

In accordance with the present disclosure, messages transmitted between the nodes 20 can be processed by circuitry within the input interface(s) 22, and/or the output interface(s) 24 and/or the control module 26. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions stored on at least one non-transient memory that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

It should be understood that the node can be implemented in a variety of manners including those shown and discussed in U.S. Pat. No. 8,223,803, Application No. 20090245289, entitled "Programmable Time Division Multiplexed Switching" the entire content of which is hereby incorporated herein by reference.

To illustrate by way of example a method for the determination of a disjoint protection path in the mesh network 40a in accordance with the present disclosure, the exemplary mesh network 40a of FIG. 2 has network topology including nodes 20A, 20B, 20C, and 20D, and communication links 30a-30f. In this example, a working path 50 is identified including node 20A, communication link 30a, node 20B, communication link 30b, and node 20C. The working path 50 has a communication link set size of two, that is, the working path 50 contains two communication links 30a and 30b.

To determine a preferred protection path that is diverse from the working path 50, in that the protection path does not use communication links 30a and 30b used in the working path 50 (referred to as "communication link disjoint"), diversity weights are assigned to the communication links 30 in the mesh, network 40a (or the diversity weights are accessed if previously assigned). The diversity weights are selected to weight certain communication links 30 over other communication links 30 based on predetermined criteria, such as sharing of resources. The diversity weights may be arbitrary values that fulfill the function of differentiating communication links 30 based on the predetermined criteria.

Diversity weights can be a property of the communication links 30. In one embodiment, the diversity weight may be a transient value calculated and stored for a particular path computation. Once the protection path is found, the diversity weights can be cleared from the communication link 30.

In one embodiment, the diversity weight may be based at least in part on the quantity of working paths of interest and/or the quantity of communication links 30 in each working path (i.e. the quantity of communication links 30 in each set). For example, in FIG. 2 the diversity weight of each communication link 30a, 30b in the working path 50 is assigned a value of the number of communication links 30 in the set—that is, two. To determine a protection path that is diverse from the working path 50 in that the protection path does not use communication links 30a and 30b used in the working path 50 (referred to as "communication link disjoint"), a predetermined diversity weight, such as zero is assigned to the other communication links 30c-30f in the mesh network 40a. Then, a Shortest Path First Algorithm, such as Dijkstra's Algorithm, may be run using the network topology and the diversity weights of the communication links 30 in the mesh network 40a.

In this example, protection path 54 through node 20A, communication link 30c, node 20B, communication link 30d, to node 20C is identified as having a cost value of zero, since the communication links 30c and 30d are assigned a diversity weight of zero. Additionally, protection path 56 through node 20A, communication link 30e, node 20D, communication link 30f, to node 20C has the same cost of zero (here, the same diversity) as protection path 54, since communication links 30e and 30f also are assigned a diversity weight of zero.

In the event that multiple protection paths 54, 56 are identified that have the same diversity from the protection path 50, the user configured weight may be used to determine which protection path is least costly, that is, is the shortest path of the multiple diverse paths, and so is the preferred protection path. For example, Dijkstra's Algorithm may be used again, this time utilizing the user configured weights.

To determine a protection path that is diverse from the working path 50 in that the protection path does not use communication links 30a and 30b in the working path 50 and in that the protection path preferably does not use the transit node 20B of the working path (referred to as "node and communication link disjoint"), different diversity weights may be assigned. A different value may be assigned to any communication link 30 that shares a transit node 20 with the working path 50 than communication links 30 that do not share a transit node 20 with the working path 50. For example, a diversity weight of "one" may be assigned to the communication links 30c and 30d that share transit node 20B with the working path 50, while a diversity weight of "zero" may be assigned to the other communication links 30e and 30f in the mesh network 40a that do not share a transit node 20 with the working path 50.

Then, a Shortest Path First Algorithm, such as Dijkstra's Algorithm, may be run using the network topology and the diversity weights in order to determine a preferred protection path. In this example, protection path 54 through node 20A, communication link 30c, node 20B, communication link 30d, to node 20C has a cost of two (based on the sum of the diversity weight of communication link 30c of one and the diversity weight of communication link 30d of one). Protection path 56 through node 20A, communication link 30e, node 20D, communication link 30f, to node 20C has a cost of zero (based on the sum of the diversity weight of communication link 30e of zero and the diversity weight of communication link 30f of zero). The cost of protection path 54 is a higher cost reflecting less diversity than protection path 56, since protection path 54 shares transit node 20B with the working path while protection path 56 does not. Therefore, in this case, protection path 56 would be preferred as being more diverse, i.e. more disjoint, from the working path 50.

It should be understood that any values can be used for the diversity weights, as long as the diversity weights force the applied algorithm, such as the Shortest Path First algorithm, to take into account the amount of diversity of communication links 30 and/or transit nodes 20 in the mesh network 40a from the working path 50.

Figure 4:
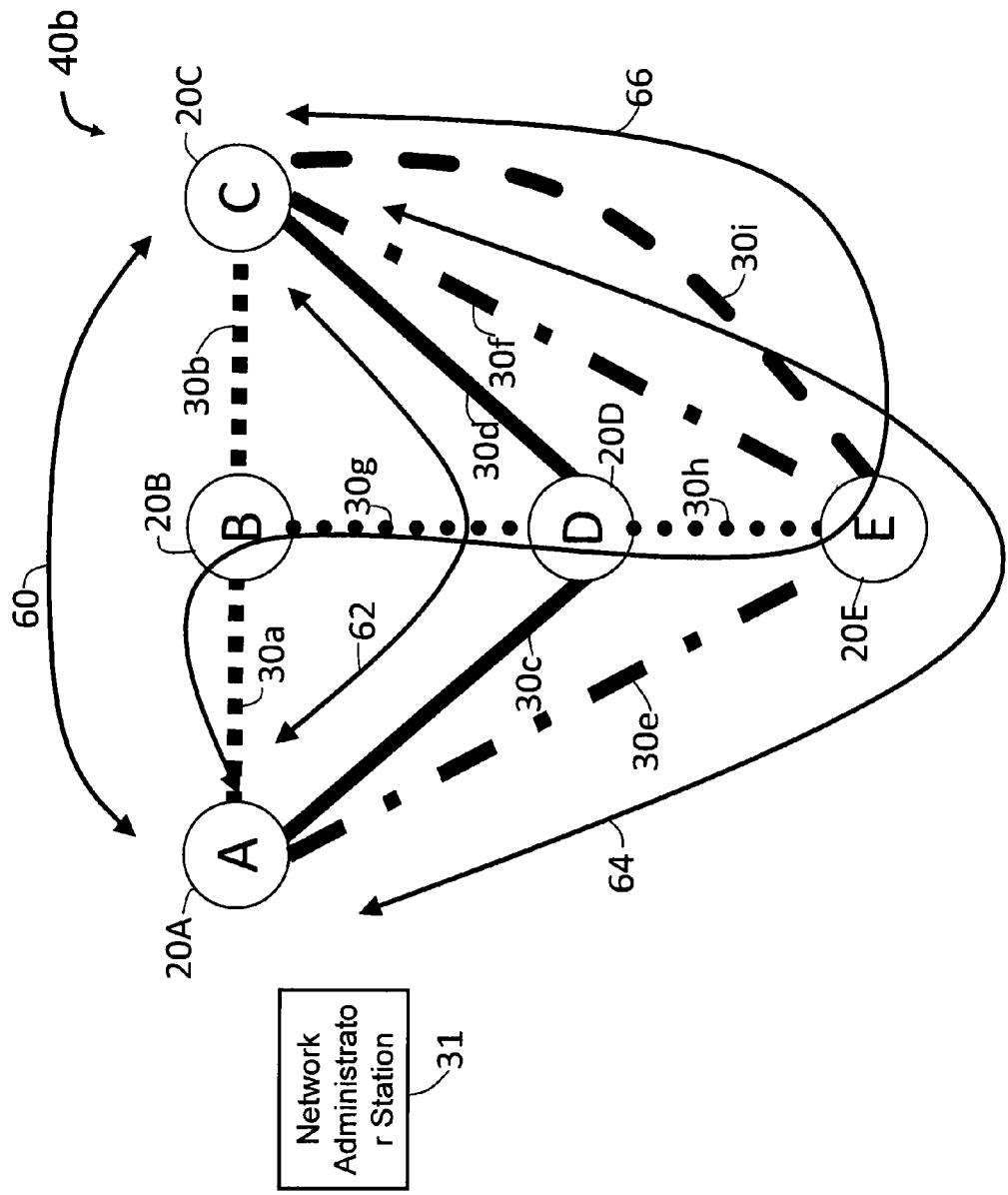
FIG. 4 is a schematic diagram of an example of a mesh network having multiple working paths.

In one embodiment, a disjoint protection path from multiple working paths 50 may be determined. For example, FIG. 4 is a schematic diagram of an exemplary mesh network 40b including nodes 20A-20E and communication links 30a-30i, in accordance with the present invention. A first working path 60, a second working path 62, and a third working path 64 are identified in the exemplary mesh network 40b. The working paths 60, 62, and 64 may be part of network configuration data indicative of network topology. Working path 60 includes node 20A, communication link 30a, node 20B, communication link 30b, and node 20C. Working path 62 includes node 20A, communication link 30c, node 20D, communication link 30d, and node 20C. Working path 64 includes node 20A, communication link 30e, node 20E, communication link 30f, and node 20C.

The working paths 60, 62, and 64 may be assigned priorities indicative of the relative importance of the working paths 60, 62, or 64 to one another in terms of protection of data traffic on the working paths 60, 62, and 64. In other words, the data traffic transmitted on the higher priority working path may be switched to a protection path before data traffic on a lower priority working path if both working paths fail in the same time period. As an example, working path 60 may be assigned a lowest priority, working path 62 may be assigned a higher priority, and working path 64 may be assigned a highest priority of the three working paths 60, 62, and 64 in the network 40b.

In a scenario with multiple working paths, such as working paths 60, 62, 64, the shortest path algorithm utilizing the diversity weights will ideally result in a preferred protection path 66 that is absolute communication link disjoint or absolute communication link and node disjoint from the highest priority working path 64 and disjoint from other working paths 60 and 62. But when there is not much diversity in the topology of the mesh network 40b, the preferred protection path 66 may overlap with lower priority working paths, using resources such as communication links 30 and nodes 20 of the lower priority working paths 60, 62 for the preferred protection path 66. If network resources are not available, the protection path 66 may even partially use network elements, such as communication links 30 and/or nodes 20 of the working path 64. However, the Shortest Path Algorithm utilizing the diversity weights will result in a protection path utilizing resources not in any of the working paths 60, 62, 64 when such resources are available.

Additionally, in one embodiment, if multiple paths have equal diversity weights, the Shortest Path Algorithm can be run again, this time using the user configured weights of the communication links 30 in the paths being considered to determine which of the paths having equal diversity weights to use as the preferred protection path.

By way of example, in the exemplary mesh network 40b illustrated in FIG. 4, to determine the preferred protection path 66 diverse from working paths 60, 62 and 64, diversity weights may be assigned to the communication links 30a-30i in the mesh network 40b (or the diversity weights may be accessed, if previously assigned). In one case, the goal may be to determine a protection path diverse from the working paths 60, 62 and more diverse from the highest priority working path 64 in that the protection path uses at least one mutually exclusive communication link 30 from the set of communication links 30 used by the working paths 60, 62 and 64 (that is, a "communication link disjoint" protection path).

To determine the preferred protection path 66, diversity weights of communication links 30 in the working paths 60, 62, 64 may reflect the priority of the working paths 60, 62, 64. For instance, the diversity weight of the communication links 30 in the highest priority working path 64 may have greater value than the communication links 30 in the higher priority working path 62. In turn, the communication links 30 in the higher priority working path 62 may have greater value than the communication links 30 in the lowest priority working path 60.

In one embodiment, the communication links 30a, 30b of the lowest priority working path 60 may be assigned a value based on the following formula:

$$D_0 = S_{max}$$

Where $D_0$ is the diversity weight of the communication links in the lowest priority working path 60 and where $S_{max}$ stands for the size of the set of the largest set of communication links 30 out of the working paths 60, 62, 64. Here, all of the working paths 60, 62, and 64 have the same size set, that is, the same quantity of communication links 30 (two communication links 30). Therefore, in this example $D_0=S_{max}=2$. The communication links 30 of the higher priority working paths 62 and 64 may be assigned a larger value.

In one embodiment, the diversity weight of the communication links in the working paths which are not the lowest priority working paths are assigned using the following formula:

$$D_i=\{S_{max} \times D_{i-1}\}+1$$

Where "i" stands for the priority of the working path for which the diversity weight is being calculated (for example, where "one" is the next to lowest priority and "n" is the highest priority), and where $S_{max}$ stands for the size of the set of the largest set of communication links 30 out of the working paths 60, 62, 64, and where $D_{i-1}$ is the diversity weight of the communication links 30 in the working path with the next highest priority to the working path currently at issue.

Again, in the example illustrated in FIG. 4, the size of the set of the largest set of communication links is two, since each of the working paths has the same number of communication links 30 (i.e., two each), and the diversity weight of the communication links 30 in the working path with the next highest priority to working path 62 is the diversity weight of the communication links 30 in working path 60 (determined as a value of two, based on $D_0=S_{max}=2$, as described above). Therefore, the diversity weight of the communication links 30c, 30d in the working path 62 would be as follows:

$$D_i=\{2 \times 2\}+1=5$$

Likewise, using the diversity weight of the communication links 30d, 30c in the working path 62 (a value of five as established above) in calculating the diversity weight of the communication links 30e, 30f in the working path 64 (the next highest priority working path) would produce a diversity weight for the working path 64 as follows:

$$D_{i+1}=\{2 \times 5\}+1=11$$

Additionally, a diversity weight of a predetermined value, for example, zero, is assigned to the communication links 30g, 30h, 30i not in working paths 60, 62, 64 in the network 40b.

Once the diversity weights are determined, a Shortest Path Algorithm, such as Dijkstra's Algorithm, using the diversity weights, may determine the preferred protection path 66 that is the shortest path through the network 40b that is diverse (here "communication link disjoint") from the working paths 60, 62 and more diverse from the working path 64 with the highest priority. In this example, the preferred protection path 66 would include node 20A, communication link 30a (diversity weight of two), node 20B, communication link 30g (diversity weight of zero), node 20D, communication link 30h (diversity weight of zero), node 20E, communication link 30i (diversity weight of zero), and node 20C, with a total diversity weight of two. Here, the preferred protection path 66 would utilize some of the resources from working path 60, which, in one embodiment, is acceptable as working path 60 has been assigned a lower priority than working path 64.

In one embodiment, it may be desirable for the preferred protection path 66 to be diverse from the working path in communication links 30 and transit nodes 20, (known as "node and communication link disjoint"). In such a case, different diversity weights may be assigned to the communication links 30 in the network 40b. In one embodiment, the communication links 30 in the lowest priority working path 60 may be assigned a diversity weight value with the following formula:

$$D_0=\{(\text{sum of the quantity of communication links in each working path})-(\text{sum of the quantity of working paths})\} \times 2$$

Where $D_0$ is the diversity weight of the communication links 30a, 30b in the lowest priority working path 60.

The diversity weight of the communication links 30 of the higher priority working paths 62, 64 may be assigned based on the formula previously identified, $D_i=\{S_{max} \times D_{i-1}\}+1$.

Additionally, a predetermined value, such as one, may be assigned to the communication links 30 not in the working paths 60, 62, 64 that share a transit node 20 with the working paths 60, 62, 64. And a different predetermined value, such as zero, may be assigned to the communication links 30 that do not share a transit node 20 with the working paths 60, 62, 64. In the example shown in FIG. 4, all of the communication links 30g, 30h, and 30i not in the working paths 60, 62, 64 share a transit node 20 with the working paths 60, 62, 64 and so would all be assigned a diversity weight value of one.

In this example, the sum of the quantity of communication links in the working paths 60, 62, 64 is six (2+2+2) and the sum of the quantity of working paths 60, 62, 63 is three. Therefore, by applying the formula $D_0=\{(\text{sum of the quantity of communication links in each working path})-(\text{sum of the quantity of working paths})\} \times 2$, the diversity weight of the communication links 30a, 30b in the lowest priority working path 60 is determined to be six ($D_0=(6-3) \times 2=6$). Applying the formula $D_i=\{S_{max} \times D_{i-1}\}+1$, the diversity weights of the communication links in the next highest priority working path 62 is determined to be thirteen ($D_i=2 \times 6+1=13$), and the diversity weights of the highest priority working path 64 is determined to be twenty-seven ($D_{i+1}=2 \times 13+1=27$).

Once the diversity weights are assigned, the Shortest Path Algorithm, such as Dijkstra's Algorithm, using the diversity weights, may determine the preferred protection path 66 that is the shortest path through the network 40b that is diverse (here, "node and communication link disjoint") from the working paths 60, 62 and more diverse from the working path 64 with the highest priority. In this example, that path would once again include node 20A, communication link 30a (diversity weight of six), node 20B, communication link 30g (diversity weight of one), node 20D, communication link 30h (diversity weight of one), node 20E, communication link 30i (diversity weight of one), and node 20C with a total diversity weight of nine. Here, the preferred protection path 66 would utilize some of the resources from working path 60, which is acceptable as working path 60 has been assigned a lower priority than working path 64.

It should be understood that any value may be assigned to the communication links 30 in the working paths for diversity weights as long as the value reflects the priority of the working paths for data protection.

Figure 5:
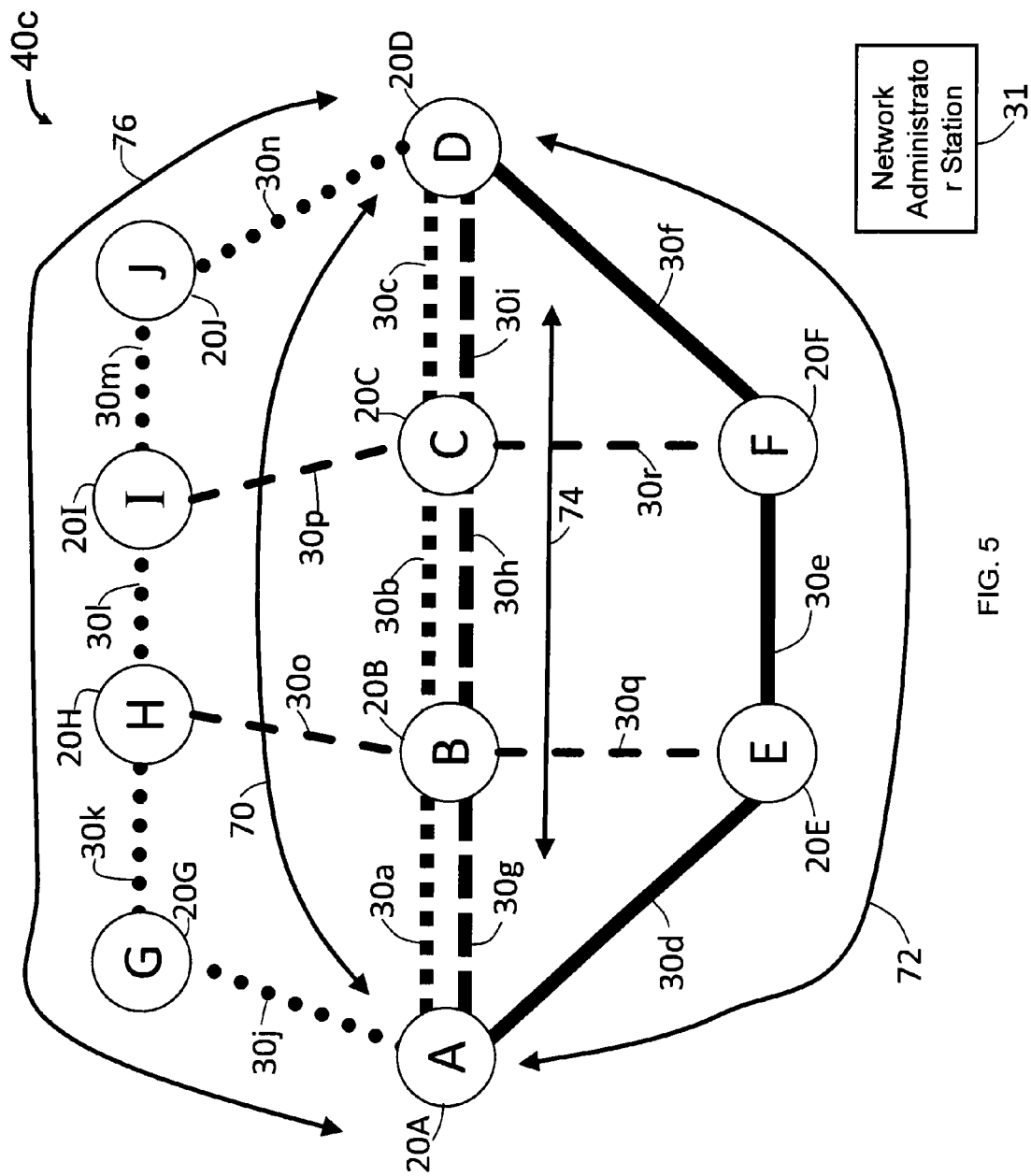
FIG. 5 is a schematic diagram of another example of a mesh network having multiple working paths.

FIG. 5 is an exemplary mesh network 40c in accordance with the present disclosure which includes nodes 20A-20J and communication links 30a-30r and has a first working path 70 and a second working path 72. The first working path 70 includes node 20A, communication link 30a, node 20B, communication link 30b, node 20C, communication link 30c, and node 20D. The second working path 72 includes node 20A, communication link 30d, node 20E, communication link 30e, node 20F, communication link 30f, and node 20D. In this example, the first working path 70 has a lower priority than the second working path 72.

To determine a "communication link disjoint" protection path, where the protection path is diverse from the lower priority working path 70 and more diverse from the highest priority working path 72 communication links 30d-30f, diversity weights are assigned to the communication links 30 in the network 40c. In this example, diversity weights of zero are assigned to the communication links 30g-30r that are not in the working paths 70, 72 in the network 40c.

To determine a "communication link disjoint" protection path, diversity weights of the communication links 30a-30c in the first working path 70, that is, the lowest priority working path 70, are assigned based on the previously discussed formula $D_0=S_{max}$ where $S_{max}$ is the maximum quantity of communication links 30 in the sets of communication links 30 in the working paths 70, 72, which in this case is three.

Diversity weights of the communication links 30d-30f in the second working path 72 (the higher priority working path) may be determined using the previously discussed formula, $D_i=\{S_{max} \times D_{i-1}\}+1$. In this case, $D_{i-1}=D_0=S_{max}=3$. Therefore, $D_i=\{3\times3\}+1=10$. Once the diversity weights are assigned, the Shortest Path Algorithm, such as Dijkstra's Algorithm, using the diversity weights, may determine the preferred protection path that is the shortest path through the network 40c that is diverse ("communication link disjoint") from the working path 72 with the highest priority. In this example, the preferred protection path 74 is node 20A, communication link 30g (diversity weight of zero), node 20B, communication link 30h (diversity weight of zero), node 20C, communication link 30i (diversity weight of zero), and node 20D, with a total diversity weight of zero.

To determine a "node and communication link disjoint" protection path, where the protection path is diverse from the lower priority working path 70 and more diverse from the communication links 30d-30f and the transit nodes 20E, 20F of the highest priority working path 72, different diversity weights are assigned to the communication links in the network 40c. In one embodiment, the diversity weights of communication links 30g-30r not in the working paths 70, 72 are assigned based on whether or not the communication links 30g-30r share a transit node with the working paths 70, 72. In this example, communication links 30g-30i and 30o-30r that share a transit node 20B, 20C, 20E, 20F with the working paths 70, 72 are assigned a weight of one, while the communication links 30j-30n that do not share a transit node 20B, 20C, 20E, 20F with the working paths 70, 72 are assigned a weight of zero.

For determination of a "node and communication link disjoint" protection path, the diversity weights of the communication links 30a-30c in the first working path 70, that is, the lowest priority working path 70, are determined with the following formula, previously described:

$D_0=\{$(Sum of the quantity of communication links in each working path)−(sum of the quantity of working paths)$\}\times 2$.

The diversity weight of the higher priority working path 72 may be assigned based on the formula previously identified, $D_i=\{S_{max} \times D_{i-1}\}+1$.

Here, the sum of the quantity of communication links 30 in each working path 70, 72 is six (since there are three communication links 30a-30c in working path 70 and three communication links 30d-30f in working path 72, therefore, 3+3=6); the sum of the working paths 70, 72 is two; and the maximum number of communication links 30 in any of the working paths 70, 72 is three. Therefore, the diversity weight of the communication links 30a-30c in the lowest priority working path 70 is eight ($D_0=(6-2)\times2=8$). And the diversity weight of the communication 30d-30f links in the higher priority working path 72 is twenty-five ($D_i=3\times8+1=25$).

Once the diversity weights are assigned, the Shortest Path Algorithm, such as Dijkstra's Algorithm, using the diversity weights, may determine the preferred protection path 76 that is the shortest path through the network 40b that is diverse ("node and communication link disjoint") from the working paths 70, 72. In this example, the preferred protection path 76 is node 20A, communication link 30j (with a diversity weight of zero), node 20G, communication link 30k (with a diversity weight of zero), node 20H, communication link 30l (with a diversity weight of zero), node 20I, communication link 30m (with a diversity weight of zero), node 20J, communication link 30n (with a diversity weight of zero), and node 20D, with a total weight of zero. Note that the preferred protection path 76 that is disjoint from the communication links 30 and the transit nodes 20 of the highest priority working path 72 is different from the preferred protection path 74 disjoint form just the communication links 30 of the working path 72. In this example, the diversity weight of protection path 74 would be three, since communication links 30g-30i share transit nodes with the working path 70 and therefore have each been assigned a diversity weight of one.

Figure 6:
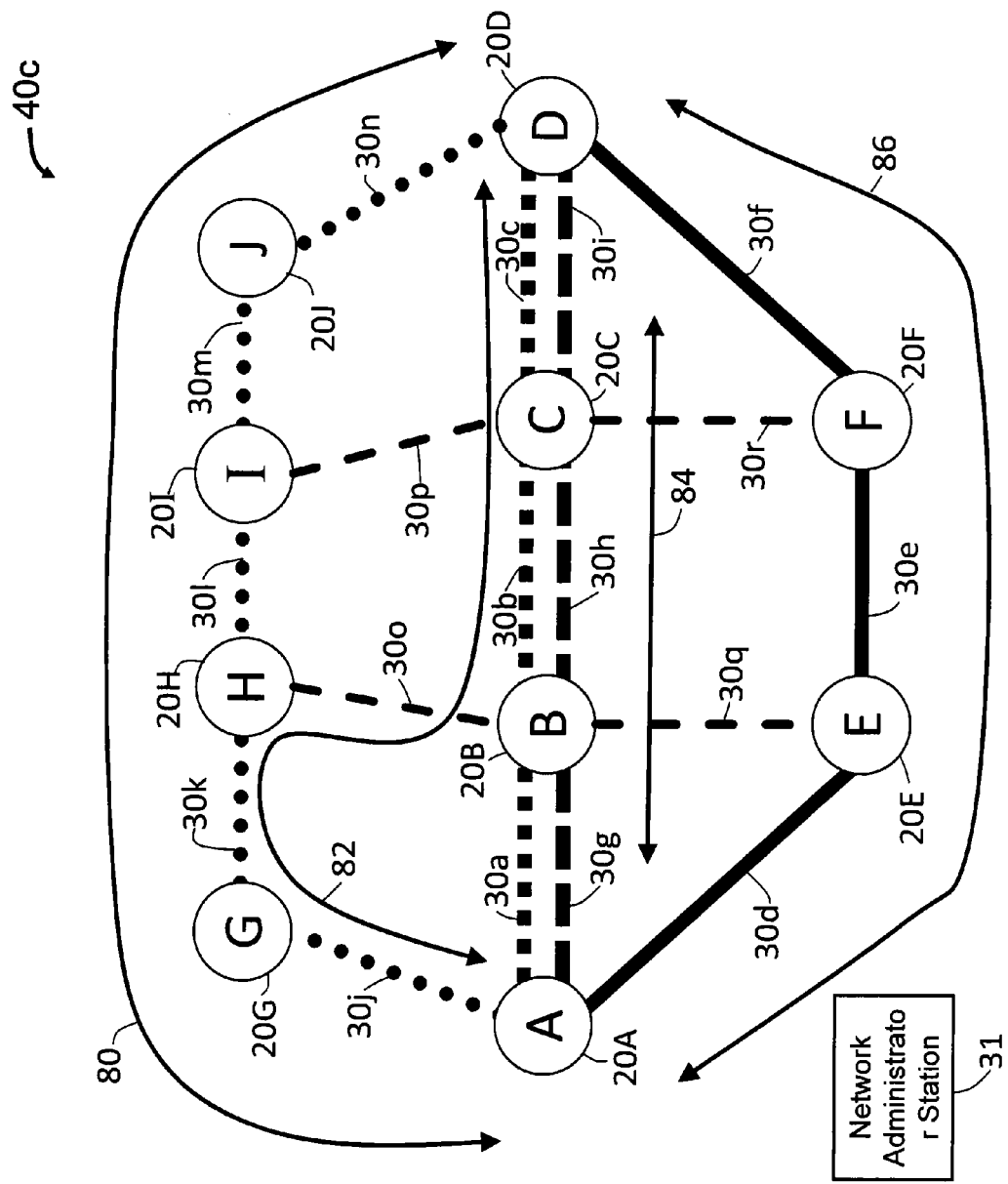
FIG. 6 is a schematic diagram of the mesh network of FIG. 5 having different multiple working paths.

As another example, FIG. 6 is a block diagram of the exemplary mesh network 40c of FIG. 5, but in which first working path 80 and second working path 82 are different than in FIG. 5. The first working path 80 includes node 20A, communication link 30j, node 20G, communication link 30k, node 20H, communication link 30l, node 20I, communication link 30m, node 20J, communication link 30n, and node 20D. The second working path 82 includes node 20A, communication link 30j, node 20G, communication link 30k, node 20H, communication link 30o, node 20B, communication link 30b, node 20C, communication link 30c, and node 20D. In this example, the first working path 80 has a lower priority than the second working path 82.

To determine a "communication link disjoint" protection path, where the preferred protection path is diverse from the working path 80 and more diverse from communication links 30j, 30k, 30o, 30b, and 30c of the highest priority working path 82, diversity weights are assigned to the communication links 30 in the network 40c. In this example, a predetermined diversity weight of zero is assigned to communication links 30a, 30d-30i, and 30p-30r in the network 40c, that is, to the communication links 30 that are not in the working paths 80, 82.

Diversity weights of the communication links 30j-30n in the first working path 80, that is, the lowest priority working path 80, are assigned a value based on the formula $D_0=S_{max}$ where $S_{max}$ is the maximum quantity of communication links 30 in the sets of communication links 30 in the working paths 80, 82, which in this case is five (since there are five communication links 30 in each of the working paths 80, 82). Diversity weights of the communication links 30j, 30k, 30o, 30b, 30c in the second working path 82 (the higher priority working path) may be determined using the previously discussed formula, $D_i=\{S_{max} \times D_{i-1}\}+1$. In this case, the diversity weight for the higher priority working path 82 is twenty-six ($D_i=5\times5+1=26$).

In the exemplary mesh network 40c of FIG. 6, the first working path 80 and the second working path 82 share communication links 30j and 30k. In this embodiment, the shared communication links 30j and 30k are first assigned a diversity weight of the lowest priority working path, here the first working path 80. Then the shared communication links 30*j* and 30*k* are reassigned the diversity weight of the higher priority working path, here the second working path 82. In this example, the diversity weights of the shared communication links 30*j* and 30*k* are initially assigned a value of five, and then reassigned a value of twenty-six.

Once the diversity weights are assigned (or accessed if previously assigned), the Shortest Path Algorithm, such as Dijkstra's Algorithm, using the diversity weights, may determine the preferred protection path 84 that is the shortest path through the network 40*c* that is diverse (here, "communication link disjoint") from the working path 82 with the highest priority. In this example, the preferred protection path 84 based on Dijkstra's Algorithm using the diversity weights could be either node 20A, communication link 30*g*, node 20B, communication link 30*h*, node 20C, communication link 30*i*, and node 20D, with a total diversity weight of zero; or could be node 20A, communication link 30*d*, node 20E, communication link 30*e*, node 20F, communication link 30*f*, and node 20D, also having a total diversity weight of zero.

In one embodiment, to determine which of the paths having equal diversity weight to use as the preferred protection path, the Shortest Path Algorithm, such as Dijkstra's Algorithm, can be run again, this time using the user configured weights of the communication links 30 in the paths being considered. Here, the user configured weights of the communication links 30*g*-30*i* was assigned as fifty whereas the user configured weights of the communication links 30*d*-30*f* was assigned as two hundred and fifty. Therefore, Dijkstra's Algorithm would indicate that the preferred protection path 84 is node 20A, communication link 30*g*, node 20B, communication link 30*h*, node 20C, communication link 30*i*, and node 20D.

To determine a "node and communication link disjoint" protection path, where the protection path is diverse from the working path 80 and more diverse from the communication links 30*j*, 30*k*, 30*o*, 30*b*, 30*c* and the transit nodes 20G, 20H, 20B, 20C of highest priority working path 82, different diversity weights are assigned to the communication links in the network 40*c* (or accessed, if previously assigned). In one embodiment, the diversity weights of communication links 30*a*, 30*d*-30*i* and 30*p*-30*r* not in the working paths 80, 82 are assigned based on whether or not the communication links 30*a*, 30*d*-30*i*, and 30*p*-30*r* share a transit node 20 with the working paths 80, 82. In this example, communication links 30*a*, 30*g*-30*i*, and 30*p*-30*r* that share a transit node 20B, 20C, 20G, 20H, 20I, 20J with the working paths 80, 82 are assigned a weight of one, while the communication links 30*d*-30*f* that do not share a transit node 20B, 20C, 20G, 20H, 20I, 20J with the working paths 80, 82 are assigned a weight of zero.

The diversity weights of the communication links 30*j*-30*n* in the first working path 80, that is, the lowest priority working path 80, are determined with the formula $D_0=\{(\text{sum of the quantity of communication links in each working path}) - (\text{sum of the quantity of working paths})\} \times 2$.

The diversity weight of the communication links 30*j*, 30*k*, 30*o*, 30*b*, and 30*c* in the higher priority working path 82 may be assigned based on the formula previously described, $D_i=\{S_{max} \times D_{i-1}\}+1$. Again, the shared communication links 30*j* and 30*k* are first assigned a diversity weight of the lowest priority working path, here the first working path 80. Then the shared communication links 30*j* and 30*k* are reassigned the diversity weight of the higher priority working path, here the second working path 82.

Here, the sum of the quantity of communication links 30 in each working path is ten (since there are five communication links 30 in each of the working paths 80, 82, therefore, 5+5=10); the sum of the working paths 80, 82 is two; and the maximum number of communication links 30 in any of the working paths 80, 82 is five. Therefore, the diversity weight of the communication links 30*j*-30*n* in the lowest priority working path 80 is sixteen ($D_0=(10-2) \times 2=16$). The diversity weight of the communication links 30*j*, 30*k*, 30*o*, 30*b*, and 30*c* in the higher priority working path 82 is eighty-one ($D_1=\{5 \times 16\}+1=81$), where shared communication links 30*j* and 30*k* are reassigned a diversity weight of eighty-one.

Once the diversity weights are assigned, the Shortest Path Algorithm, such as Dijkstra's Algorithm, using the diversity weights, may determine the protection path that is the shortest path through the network 40*c* that is diverse (here, "node and communication link disjoint") from the working paths 80 and 82. In this example, the preferred protection path 86 is node 20A, communication link 30*d* (with a diversity weight of zero), node 20E, communication link 30*e* (with a diversity weight of zero), node 20F, communication link 30*f* (with a diversity weight of zero), and node 20D, with a total weight of zero. Note that the preferred protection path 86 that is disjoint from the communication links 30 and the transit nodes 20 of the highest priority working path 82 is different from the preferred protection path 84 disjoint form just the communication links 30 of the working path 82.

Figure 7:
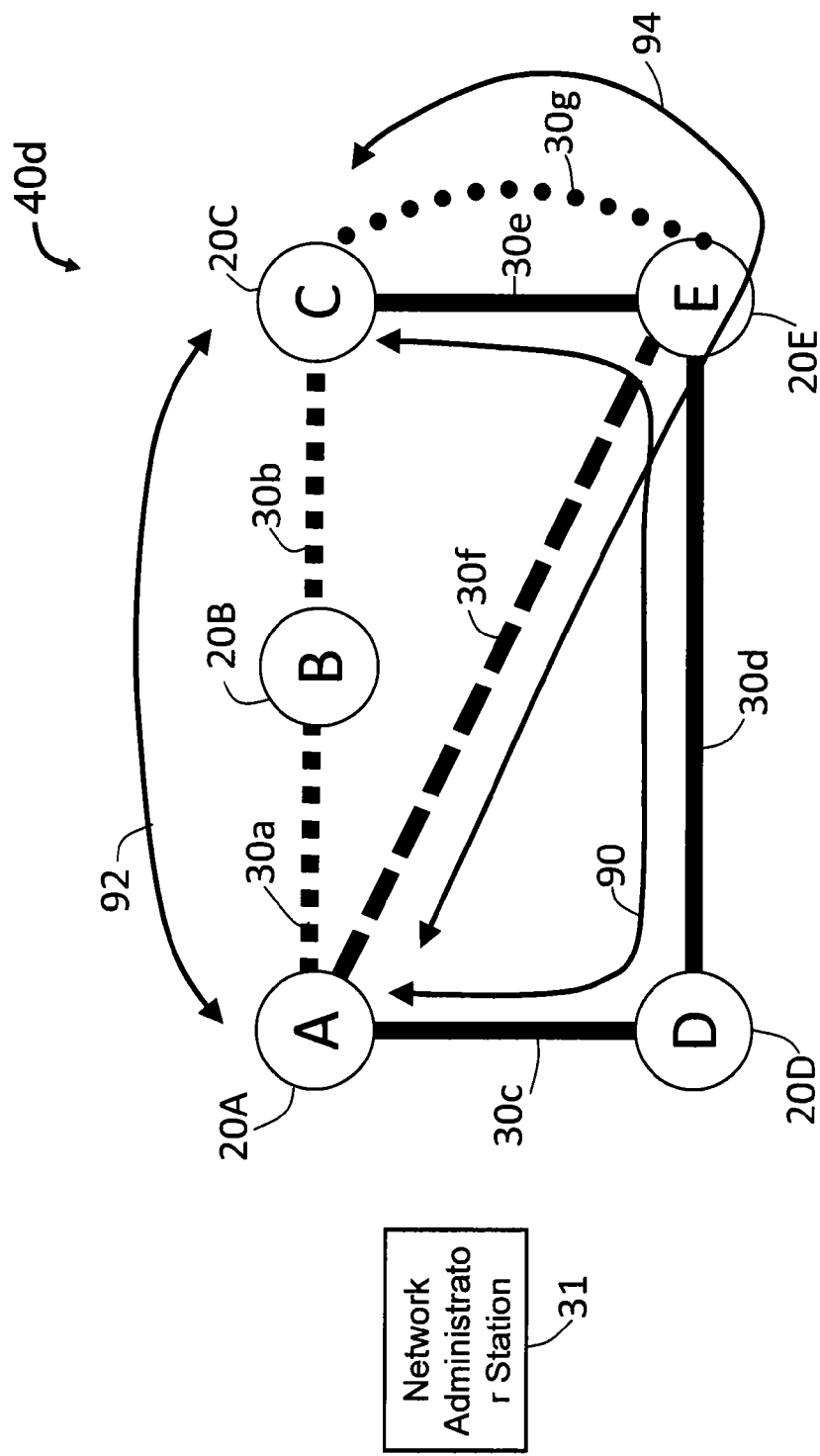
FIG. 7 is a schematic diagram of yet another example of a mesh network having multiple working paths.

As another example, FIG. 7 is a block diagram of an exemplary mesh network 40*d* having a first working path 90 and a second working path 92, in which the first working path 90 has the lowest priority of the working paths 90, 92. The first working path 90 includes node 20A, communication link 30*c*, node 20D, communication link 30*d*, node 20E, communication link 30*e*, and node 20C. The second working path 92 includes node 20A, communication link 30*a*, node 20B, communication link 30*b*, and node 20C.

To determine a "communication link disjoint" protection path, where the protection path is diverse from the working path 90 and more diverse from the communication links 30*c*-30*e* of the highest priority working path 92, diversity weights are assigned to the communication links 30 in the network 40*d*. In this example, a predetermined diversity weight of zero is assigned to communication links 30*f*-30*g* in the network 40*d*, that is, to the communication links 30 that are not in the working paths 90, 92. Diversity weights of the communication links 30*c*-30*e* in the first working path 90, that is, the lowest priority working path, are assigned a value based on the formula $D_0=S_{max}$ where $S_{max}$ is the maximum quantity of communication links 30 in the sets of communication links 30 in the working paths 90, 92, which in this case is three (three communication links 30*c*, 30*d*, 30*e* in the first working path 90, and two communication links 30*a*, 30*b* in the second working path 92).

Diversity weights of the communication links 30*a*, 30*b* in the second working path 92 (the higher priority working path) may be determined using the previously discussed formula, $D_i=\{S_{max} \times D_{i-1}\}+1$. In this case $D_i=\{3 \times 3\}+1=10$.

Once the diversity weights are assigned, the Shortest Path Algorithm, such as Dijkstra's Algorithm, using the diversity weights, may determine the preferred protection path 94 that is the shortest path through the network 40*d* that is diverse (here, "communication link disjoint") from the working paths 90 and 92. In this example, the preferred protection path 94 based on Dijkstra's Algorithm using the diversity weights is node 20A, communication link 30*f* (with a diversity weight of zero), node 20E, communication link 30*g* (with a diversity weight of zero), and node 20C, having a total diversity weight of zero.

Again, if multiple paths have equal diversity weights, to determine which of the paths having equal diversity weight to use as the preferred protection path, the Shortest Path Algorithm, such as Dijkstra's Algorithm, can be run again, this time using the user configured weights of the communication links 30 in the paths being considered.

The methods described herein may be carried out by the circuitry of the source node 20, or may be partially carried out by the source node 20. The methods may be carried out outside the source node 20 and resulting information may be provided to source node 20. For example, the method may be carried out by one or more processor 32, such as a processor 32 in a network management station/network administrator station 31.

It should be understood that the working paths and protection paths may be any number, length or configuration, and that a limited number of transit nodes 20 and communication links 30 are used in the previous examples for purposes of clarity.

Additionally, it should be understood that the topology of the mesh network 40, including the working path connection and/or the shortest paths through the mesh network 40 for connections, may be determined in other ways and/or may be provided to the source node 20.

Additionally, it should be understood that this method may be applied to any protection or protection scenario for any mesh network.

CONCLUSION

Conventionally, methods of determining protection paths in mesh networks may not consider level of diversity. In accordance with the present disclosure, apparatuses and methods are described to determine protection paths including consideration of diversity, and for implementation of such protection. Additionally, for multiple working paths, path priority is taken into consideration when determining a protection path.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes. In this situation, the nodes may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:
RFC 2328 "OSPF Version 2," Moy, J., The Internet Society, April 1998.
RFC 3473 "Generalized Multi-Protocol Label Switching (GMPLS) Signaling Resource ReserVation Protocol-Traffic Engineering (RSVP-TE) Extensions," Berger (Ed.), The Internet Society, January 2003.
RFC 3945 Mannie, E., "Generalized Multi-Protocol Label Switching (GMPLS) Architecture", RFC 3945, October 2004.
RFC 4379 "Detecting Multi-Protocol Label Switched (MPLS) Data Plane Failures," Kombella, K. and Swallow, G., The Internet Society, February 2006.
RFC 5340 "OSPF for IPv6," Coltun et al., The Internet Society, July 2008.
G.709-v3 ITU-T, "Interfaces for the Optical Transport Network (OTN)", G.709 Recommendation, December 2009.
G.872 ITU-T, "Architecture of optical transport networks", November 2001.
E. W. Dijkstra: "A note on two problems in connection with graphs," Numerical Mathematics, 1:269-271, 1959.

What is claimed is:

1. A computer-readable medium, comprising:
at least one non-transient memory storing instructions that, when executed by one or more processors, cause the one or more processors to:
access network configuration data indicative of a network topology of a mesh network comprising a plurality of nodes and a plurality of communication links configurable to provide optical paths between a source node of the plurality of nodes and a destination node of the plurality of nodes, the network configuration data identifying a working path configured to transport data between the source node and the destination node, the working path having a first set of at least the source node and the destination node of the plurality of nodes and at least one communication link of the communication links, the network configuration data also including at least one first diversity weight of a first value indicative of at least one communication link in the working path, and at least one second diversity weight of a second value indicative of at least one communication link outside of the working path;
calculate a disjoint protection path for the working path with the network configuration data indicative of the network topology of the mesh network, the at least one first diversity weight, and the at least one second diversity weight; the disjoint protection path having a second set of (a) nodes including at least the source node and the destination node and (b) at least one communication link that is mutually exclusive from the at least one communication link of the first set; and
output at least one setup signal to configure the disjoint protection path within the mesh network.

2. The computer-readable medium of claim 1, wherein the at least one first diversity weight of a first value indicative of at least one communication link in the working path is based at least in part on quantity of communication links in the working path.

3. The computer-readable medium of claim 1, wherein the at least one second diversity weight of the second value indicative of at least one communication link outside of the working path is a predetermined value.

4. The computer-readable medium of claim 3, wherein the predetermined value is zero.

5. The computer-readable medium of claim 3 wherein the predetermined value is based at least in part on whether the at least one communication link outside of the working path shares a node with the working path.

6. The computer-readable medium of claim 5, wherein the predetermined value, based at least in part on whether the at least one communication link outside of the working path shares a node with the working path, is a higher value if the at least one communication link shares a node with the working path than if the at least one communication link does not share a node with the working path.

7. The computer-readable medium of claim 6, wherein the predetermined value based at least in part on a number of nodes shared by the disjoint protection path and the working path is set at one if the at least one communication link shares a node with the working path and set at zero if the at least one communication link does not share a node with the working path.

8. The computer-readable medium of claim 1, wherein to calculate a disjoint protection path for the working path with the network configuration data indicative of the network topology of the mesh network, with the at least one first diversity weight, and with the at least one second diversity weight, further comprises utilizing a disjoint protection algorithm.

9. The computer-readable medium of claim 8, wherein the algorithm is a Shortest Path Algorithm.

10. The computer-readable medium of claim 9, wherein the Shortest Path Algorithm is an algorithm that provides a shortest path between a first node and a second node on the topology of the mesh network based on weights assigned to the communication links between the first node and the second node.

11. The computer-readable medium of claim 9, wherein the algorithm is Dijkstra's Algorithm.

12. The computer-readable medium of claim 1,
wherein the working path is a first working path and wherein the network configuration data is further identifying a second working path configured to transport data between the source node and the destination node, the second working path having a third set of at least the source node and the destination node of the plurality of nodes and at least one communication link of the plurality of communication links, the at least one communication link mutually exclusive from the at least one communication link of the first set;
wherein the first working path has a first priority and the second working path has a second priority; and
wherein the network configuration data also including at least one third diversity weight of a third value indicative of at least one communication link in the second working path.

13. The computer-readable medium of claim 12, wherein the first priority is lower in priority than the second priority.

14. The computer-readable medium of claim 13, wherein, in a failure of the first and second working paths, the data carried on the second working path having a higher priority is switched to a disjoint protection path before the data carried on a first working path having a lower priority is switched.

15. The computer-readable medium of claim 12, wherein the first diversity weights are assigned a value based at least in part on a largest quantity of communication links in the first or second working paths.

16. The computer-readable medium of claim 12, wherein the third diversity weights are based on an algorithm as follows:
(quantity of communication links in the first or second working path based on a largest quantity of communication links of the first or second working paths) multiplied by (the first diversity weight) plus one.

17. The computer-readable medium of claim 12, wherein the first diversity weights are based on an algorithm as follows:
[(sum of a quantity of communication links in the first working path and the second working path) minus (sum of the quantity of working paths)] multiplied by two.

18. The computer-readable medium of claim 12, wherein the at least one second diversity weight of the second value indicative of at least one communication link outside of the working path is a predetermined value.

19. The computer-readable medium of claim 18, wherein the predetermined value is zero.

20. The computer-readable medium of claim 18 wherein the predetermined value is based at least in part on whether the at least one communication link outside of the working path shares a node with the working path.

21. The computer-readable medium of claim 20, wherein the predetermined value, based at least in part on whether the at least one communication link outside of the working path shares a node with the working path, is a higher value if the at least one communication link shares a node with the working path than if the at least one communication link does not share a node with the working path.

22. The computer-readable medium of claim 21, wherein the predetermined value based at least in part on a number of nodes shared by the disjoint protection path and the working path is set at one if the at least one communication link shares a node with the working path and set at zero if the at least one communication link does not share a node with the working path.

23. The computer-readable medium of claim 12, wherein to calculate a disjoint protection path for the working path with the network configuration data indicative of the network topology of the mesh network, with the at least one first diversity weight, and with the at least one second diversity weight, further comprises utilizing a disjoint protection algorithm.

24. The computer-readable medium of claim 23, wherein the algorithm is a Shortest Path Algorithm.

25. The computer-readable medium of claim 24, wherein the Shortest Path Algorithm is an algorithm that provides a shortest path between a first node and a second node on the topology of the mesh network based on weights assigned to the communication links between the first node and the second node.

26. The computer-readable medium of claim 23, wherein the algorithm is Dijkstra's Algorithm.

27. The computer-readable medium of claim 23, wherein the results of the algorithm determine a preferred disjoint protection path through the mesh network, wherein the preferred disjoint protection path is more diverse from the working path than other possible protection paths, where increased diversity is indicative of fewer shared resources between the working path and the protection path.

28. The computer-readable medium of claim 27, wherein if the algorithm produces more than one disjoint protection path with a same value, the preferred disjoint protection path is determined based on user configured weight.

* * * * *